United States Patent
Parker et al.

(10) Patent No.: US 6,761,404 B2
(45) Date of Patent: Jul. 13, 2004

(54) VEHICLE SEAT COVER AND METHOD

(75) Inventors: Dustin Parker, Delaware, OH (US); Kyle Davidson, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/155,409

(22) Filed: May 24, 2002

(65) Prior Publication Data

US 2003/0218367 A1 Nov. 27, 2003

(51) Int. Cl.⁷ ............................................. A47C 27/00
(52) U.S. Cl. ................. 297/229; 297/228.1; 297/226
(58) Field of Search ............................... 297/225, 229, 297/219.1, 226, 228.1; 5/653, 657.5, 737

(56) References Cited

U.S. PATENT DOCUMENTS

| | | | |
|---|---|---|---|
| 3,278,226 A | * 10/1966 | Magnusson | ............... 297/228.1 |
| 3,695,692 A | 10/1972 | Williams | |
| 4,400,030 A | 8/1983 | Maruzzo et al. | |
| 4,676,376 A | 6/1987 | Keiswetter | |
| 4,789,201 A | 12/1988 | Selbert | |
| 4,790,592 A | * 12/1988 | Busso et al. | ............ 297/184.11 |
| 4,867,507 A | 9/1989 | Arai | |
| 4,877,288 A | * 10/1989 | Lee | ............................. 297/229 |
| 4,884,839 A | 12/1989 | Keiswetter | |
| 5,028,472 A | 7/1991 | Gray | |
| 5,121,938 A | * 6/1992 | Gross et al. | ............... 280/304.1 |
| 5,234,252 A | * 8/1993 | Wallach | ......................... 297/229 |
| 5,308,141 A | * 5/1994 | Robinson et al. | ........... 297/218.4 |
| 5,326,152 A | * 7/1994 | Baron | .......................... 297/229 |
| 5,709,431 A | * 1/1998 | Horn | ........................ 297/228.1 |
| 5,716,096 A | 2/1998 | Pryde et al. | |
| 5,879,051 A | 3/1999 | Cozzani | |
| 6,050,639 A | * 4/2000 | Horn | ........................... 297/229 |
| 6,067,777 A | 5/2000 | Stoll | |
| 6,382,720 B1 | * 5/2002 | Franklin et al. | ........ 297/228.13 |
| 6,439,531 B1 | * 8/2002 | Severini et al. | .............. 248/423 |

* cited by examiner

Primary Examiner—Peter M. Cuomo
Assistant Examiner—Stephanie Harris
(74) Attorney, Agent, or Firm—Rankin, Hill, Porter & Clark LLP; Alan T. McDonald; Vincent Ciamacco

(57) ABSTRACT

A securable protective seat cover, system and method. For a manually adjustable vehicle seat, a securable protective seat cover apparatus includes a seat cushion and an adjustor bar. The apparatus also includes a plastic film shaped to cover the vehicle seat. The film includes a front portion that includes a first seal portion, a second seal portion, and a surrounding portion. The first and second seal portions are directly secured to one another at a side of the adjustor bar so as to attach the surrounding portion to the adjustor bar. For a power adjustable vehicle seat, a temporary plastic protective seat cover system includes a front cover mounted below the power adjustable vehicle seat. The front cover includes a hook. The system also includes a plastic film that is shaped to cover the vehicle seat and is adapted to be secured to the hook.

11 Claims, 4 Drawing Sheets

VEHICLE SEAT COVER AND METHOD

BACKGROUND OF THE INVENTION

1. Field of the Invention

The invention relates generally to a protective cover for a vehicle seat. In particular, the invention relates to a temporary plastic cover that is secured to an automobile seat.

2. Description of Related Art

A temporary seat cover can protect a vehicle seat from, for example, soil and moisture. Thus, installing a protective cover over a seat during the manufacture and installation of the seat can protect the seat while it is an inventory item, during its installation in a vehicle, during subsequent manufacture/assembly of the vehicle, and during shipment of the vehicle.

Unfortunately, the protective cover is often dislodged from the seat during manufacture of the vehicle, especially the portion covering the seat cushion portion of the vehicle seat. A dislodged cover can leave the seat or a portion of the seat exposed, unprotected, and susceptible to staining or soiling. Therefore, it is desirable to secure the cover to the seat, and to thereby minimize the chance of dislodging of the seat cover during manufacture of the vehicle.

SUMMARY OF THE INVENTION

The present invention provides a securable protective seat cover for use with a manually adjustable vehicle seat. The seat cover includes a plastic film shaped to cover the vehicle seat. The film has a seam to secure the film to an adjustor bar of the seat so as to protect the seat. The invention also provides a method of covering the manually adjustable vehicle seat with the plastic film, and securing the film about the adjustor bar.

Additionally, the invention provides a temporary plastic protective seat cover system for use with a power adjustable vehicle seat. The system includes a plastic film shaped to cover the vehicle seat. The seat includes a hook to secure the film to the vehicle seat. The invention further provides a method of protecting the power adjustable vehicle seat. The method includes covering the power adjustable vehicle seat with the plastic film, and securing the film to the hook on the seat.

DETAILED DESCRIPTION OF PREFERRED EMBODIMENTS

Figure 1:
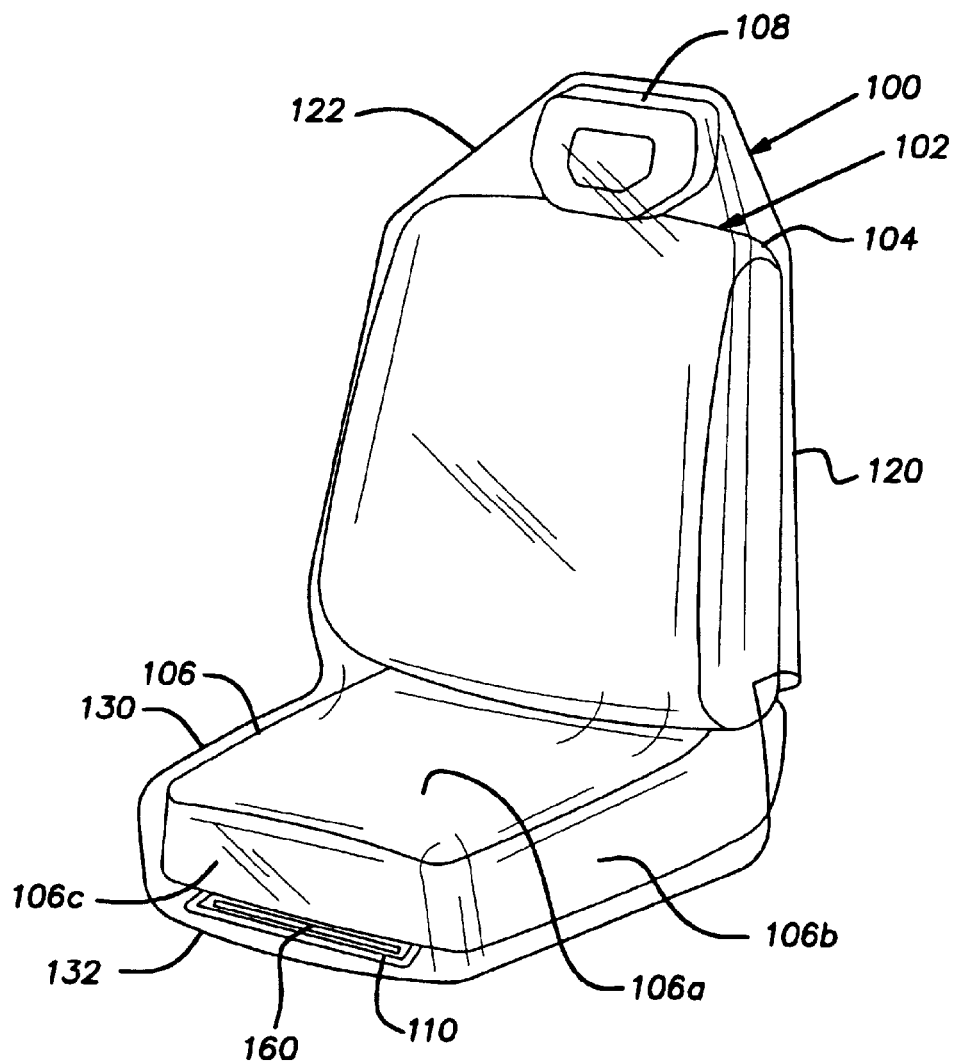
FIG. 1 is a perspective view of an article comprising a first embodiment of the invention.

A protective cover article 100 comprising a first embodiment of the invention is shown in FIG. 1. The cover 100 is placed over a vehicle seat 102 to protect the seat 102 from, for example, soil and moisture, and is secured to the seat 102 until it is desired to remove the cover 100.

Figure 2:
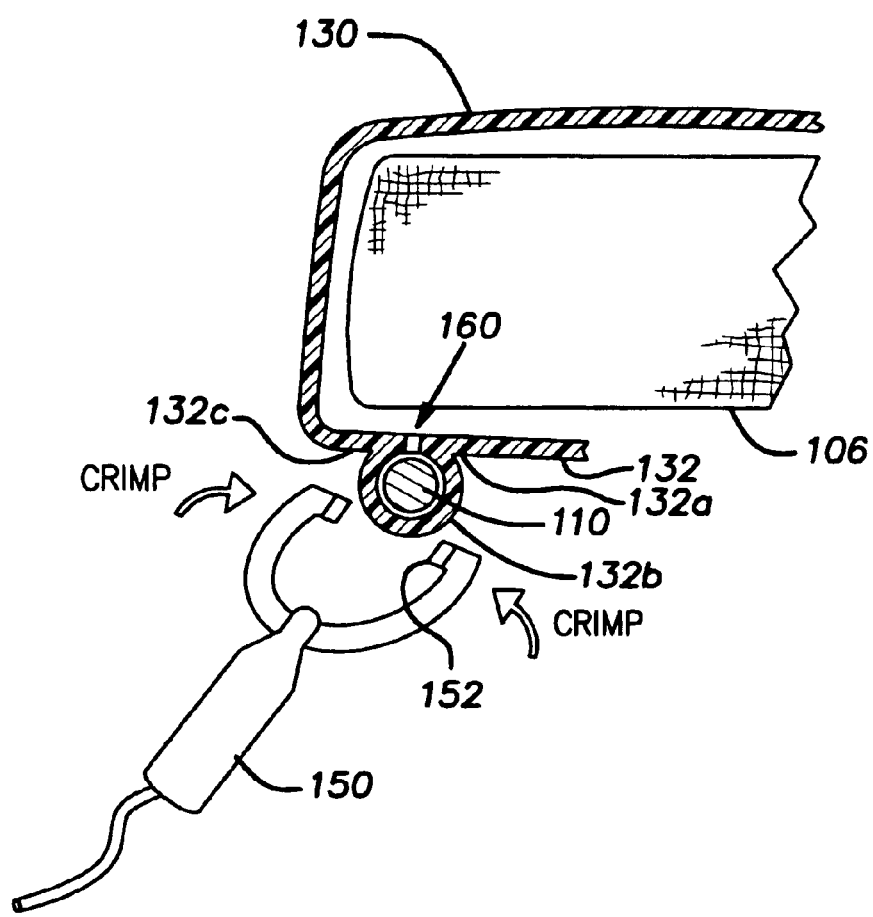
FIG. 2 is a schematic cross-sectional side view of part of the article shown in FIG. 1.

With reference to FIGS. 1 and 2, the vehicle seat 102 is a manually adjustable automobile seat assembly, which includes a seat back 104, a seat cushion 106 and a headrest 108. The vehicle seat 102 also includes an adjustor bar 110 for allowing the seat 102 to be moved forward and rearward as desired by a vehicle occupant. The bar 110 is located on the front of the seat 102 below the seat cushion 106, and is shaped like a squared-off letter U. It is submitted that numerous seat assemblies are known in the art and are generally interchangeable with the illustrated seat 102.

The cover 100 is a heat-sealable, transparent, thermoplastic, polyethylene film. Preferably, the film has three layers of about 0.025 millimeter (mm) (1 mil) each, for a total thickness of about 0.076 (3 mil). The first layer is an outside layer with slip properties. The second layer is a post consumer recycled (PCR) content layer with about 25 percent PCR. The inside layer has grip properties to allow the film to grip the seat 102. Forming the outside layer with slip properties and the inside layer with grip properties provides a more functional temporary cover. Namely, the slippery outside layer facilitates the user or occupant moving across the seat while the grip afforded by the inside layer retains the cover in place relative to the seat 102. The film preferably has the mechanical properties shown in TABLE 1. Values for machine direction (MD) and for transverse direction (TD) are shown for tensile strength, elongation and tear strength in TABLE 1. The MD and TD values relate to manufacture of the film as known to one skilled in the art of film manufacture.

TABLE 1

Film Properties

| Property | Value |
| --- | --- |
| Tensile Strength (psi) | 1800 MD |
|  | 1600 TD |
| Elongation (%) | 550 MD |
|  | 625 TD |
| Tear Strength (grams) | 450 MD |
|  | 750 TD |
| Coefficient of Friction | Outside <0.375 |
|  | Inside >0.475 |
| Seam strength | 70 percent of MD tensile strength |

The cover 100 fits over and conforms to the different parts of the seat 102. In particular, the cover 100 has several different portions that correspond to the different parts of the seat 102. A back portion 120 is pocket-shaped and fits over the back cushion 104. A tapered upper part 122 of the back portion 120 fits over the headrest 108. A seat portion 130 fits over the seat cushion 106 to include the upper-part 106a, the sides 106b and the front 106c of the seat cushion 106. In particular, the seat portion 130 has an extended front portion 132 that extends around and under the seat cushion 106.

A heat-sealing crimper 150 is shown in FIG. 2. The crimper 150 is a scissors-type heat sealer that can extend around the adjustor bar 110. Suitable crimpers are commercially available from, for example, Abbeon Cal, Inc. (Santa Barbara, Calif.). The crimper 150 can articulate in the direction indicated by the directional arrows labeled CRIMP. During use, a heating element 152 at an end of the crimper 150 is heated to a temperature that will melt the film to seal the film to itself and create a heat-sealed seam 160. Preferably, the heating element has a length dimension that is substantially equal to the length of the adjustor bar 110. In this embodiment, the seam 160 is a single, solid bar line seal. Alternatively, a suitable seam can be an array of small, alternating sealed and unsealed sections. As shown in FIG. 1, the seam 160 extends along a length of the adjustor bar 110.

During assembly, the back portion 120 of the cover 100 slides over the seat back 104. The headrest 108 nests in the tapered upper part 122 of the back portion 120. The seat portion 130 drapes over the seat cushion 106. Preferably, a seat belt (not shown) crosses the seat 102 and the cover 100 at the juncture of the back and seat cushions 104, 106. The seat belt aids in that the cover 100 can be pulled across the seat cushion 106 without pulling the cover 100 away from the seat back 104.

The front portion 132 is pulled around the front of the seat cushion 106 and further to the adjustor bar 110. The front portion 132 is folded or wrapped around the adjustor bar 110 to define a first seal portion 132a, a surrounding portion 132b, and a second seal portion 132c. The surrounding portion 132b is disposed between the first and second seal portions 132a, 132c and extends around the adjustor bar 110. The first and second seal portions 132a, 132c are engaged with one another, relatively above the adjustor bar 110 and are brought into engagement by the crimper 150, which crimps and melts the first and second seal portions 132a, 132c of the front portion 132 to one another, securing the surrounding portion 132b around the adjustor bar 110, and thereby creating the heat-sealed seam 160 in the film. The seam 160 positively secures the cover 100 to the seat 102 and maintains the cover 100, the seat portion 130, and the front portion 132 in position relative to the seat cushion 106.

With the seal 160 in place, the cover 100 resists being dislodged during the handling, shipping and installation of the seat 102. Because the cover 100 is in proper placement with respect to the seat 102, exposure of the seat 102 to soil and moisture is minimized and the seat 102 is thus protected.

Figure 3:
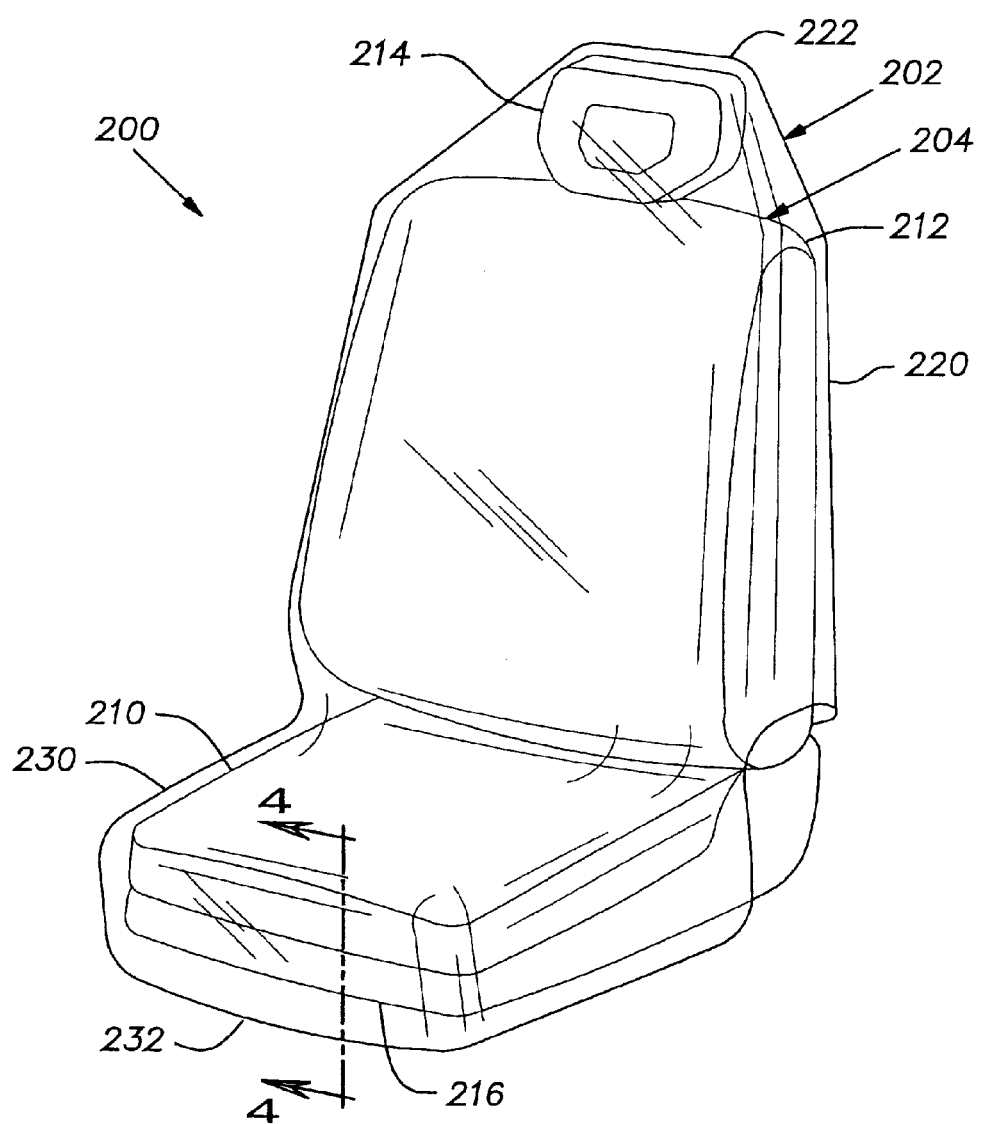
FIG. 3 is a perspective view of a system comprising a second embodiment of the invention.
Figure 4:
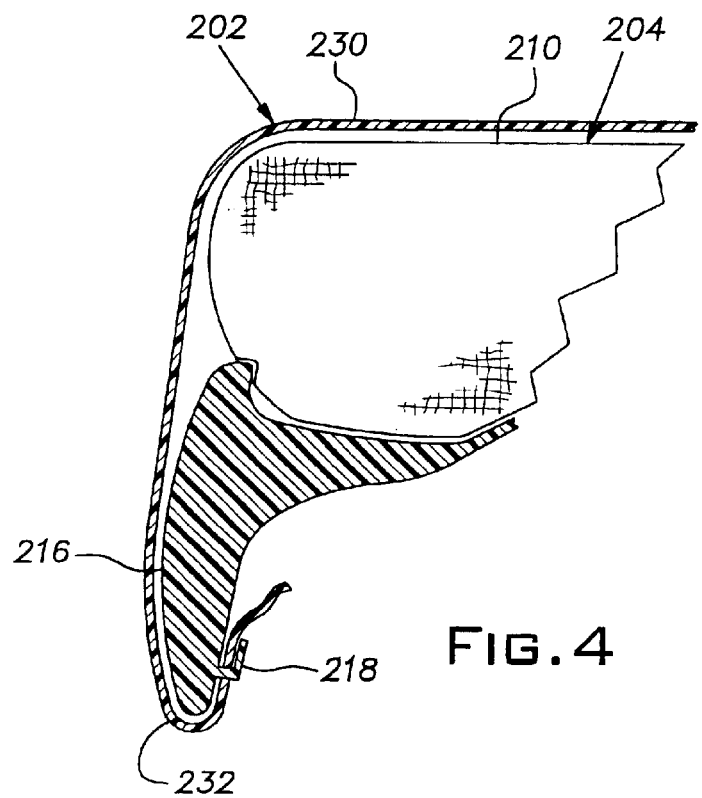
FIG. 4 is a cross-sectional view of the system shown in FIG. 3 along the line 4—4.
Figure 5:
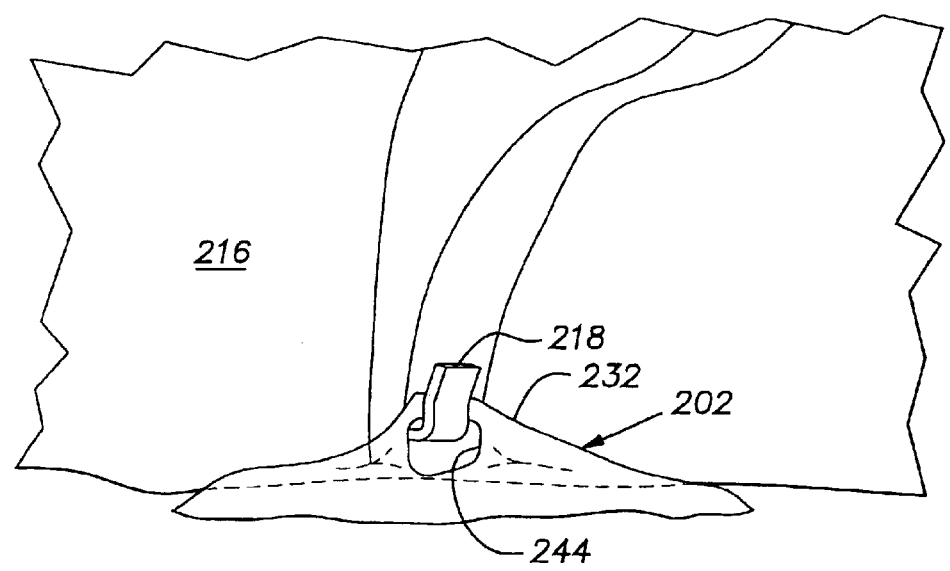
FIG. 5 is a perspective reverse angle view of part of the system shown in FIG. 3.

A system 200 comprising a second embodiment of the invention is shown in FIGS. 3–5. The system 200 includes a cover 202 for a power vehicle seat 204.

In many respects the power vehicle seat 204 is similar to the manual seat 102 described above. In particular, the seat 204 has a seat cushion 210, a seat back 212, and a headrest 214 mounted on the upper part of the seat back 214. However, because the seat 204 is a power adjustable seat, it has a front shield 216 where the manual adjustor bar 110 would otherwise be located. In the power seat 204 according to the preferred and illustrated embodiment, the front shield 216 has a hook 218 (FIG. 4) for securing the cover 202 to the seat 204. The hook 218 is molded as part of the front shield 216.

The cover 202 is like the cover 100, in that it fits over the seat 204 and has several portions. In particular, the cover 202 has a back portion 220 that is pocket-shaped and fits over the seat back 212. A tapered upper part 222 of the back portion 220 fits the headrest 214. A seat portion 230 fits over the seat cushion 210 to include the upper-part, the sides and the front of the seat cushion 210. In particular, the seat portion 230 has an extended front portion 232 that extends around and under the seat cushion 210.

The cover 202 has an aperture 244 defined by the extended portion 232 of the cover 202. The aperture 244 has a diameter slightly larger than the width of the hook 218. The aperture 244 is arranged on the extended portion 232 so as to align with the hook 218 during assembly.

During assembly, the back portion 220 slides over the seat back 212 of the seat 204. A seat belt (not shown) may or may not be strapped across the seat 204 at the junction of the seat cushion 210 and the seat back 212 to hold the cover 202 snugly against the seat 204. The cover 202 is tight to the seat 204 preventing the cover 202 from being easily removed. Some cars are shipped with strapped seat belts, some are not.

The seat portion 230 drapes over the seat cushion 210. The front portion 232 is pulled down and around the front of the seat 204 and further around the front shield 216. The aperture 244 aligns with the hook 218 and the hook 218 extends through the aperture 244, and thereby secures the cover 202 to the seat 204.

With the hook 218 extending through the aperture 244 to secure the cover 202 to the seat 204, the cover 202 resists being dislodged during the handling, shipping and installation of the seat 204 and during subsequent manufacture of the vehicle. Because the cover 202 is in proper placement with respect to the seat 204, exposure of the seat 204 to soil and moisture is minimized and the seat 204 is thus protected.

In an alternative embodiment, a separate or folded reinforcing layer is heat-sealed around the periphery of an aperture similar to the aperture 244 so as to reinforce the aperture. In yet another alternative embodiment, a cover similar to the cover 202 secures to a hook similar to the hook 218 by pulling the film up and over the hook, and thereby to allow a resilient, elastic property of the film to secure the film to the hook. Alternatively, the film can be pulled up and over the hook, and the hook can be pushed through the film to create an aperture, thus securing the film to the hook.

If desired, alternative covers can be tinted and opaque. In addition, the film can contain additives that impart various properties to the film. Envisioned additives include an anti-mildewing agent to protect against mildew, an odorant to scent the seat and vehicle, and an ultraviolet absorber to protect against UV damage, any and all of which can help to further protect the seat 204. In another embodiment, the cover 202 is screen printed with a desired message or indicia. In yet other alternative embodiments, a seam securing a cover to a manual adjustor bar is formed by an adhesive, radiant energy or double sided tape.

The embodiments described herein are examples of structures, systems and methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems and methods that do not differ from the literal language of the claims, and further includes other structures, systems and methods with insubstantial differences from the literal language of the claims.

What is claimed is:

1. A securable protective seat cover apparatus, comprising:
   a manually adjustable vehicle seat comprising a seat cushion and an adjustor bar, said adjustor bar being disposed beneath said seat cushion; and
   a plastic film shaped to cover the vehicle seat, said film including a front portion that extends over and below said seat cushion, said front portion including a first seal portion, a second seal portion, and a surrounding portion, said surrounding portion being disposed between said first and second seal portions and extending around the adjustor bar, said first and second seal portions being directly secured to one another to form a seam that extends along a length of said adjustor bar so as to attach the surrounding portion to the adjustor bar and thereby to secure the film to the vehicle seat.

2. The cover as defined in claim 1, wherein the film is a heat-sealable film and the seam is a heat-sealed crimped seam.

3. The cover as defined in claim 2, wherein the seam is a single line-sealed seam.

4. The cover as defined in claim 1, wherein the seat further comprises a seat back, and the film defines a pocket at an upper end to fit over the seat back of the seat.

5. The cover as defined in claim 4, wherein the seat further comprises a headrest mounted on the seat back, and the film further defines a tapered upper part that fits over the headrest.

6. The cover as defined in claim 1, wherein the film has a side flap to cover a corresponding side of the seat cushion.

7. The cover as defined in claim 1, wherein the film is selected from the group consisting of transparent film, translucent film, opaque film, printed film, scented film, ultraviolet resistant film, and mildew resistant film.

8. A method of protecting a manually adjustable vehicle seat, said vehicle seat including a seat cushion, and an adjustor bar disposed beneath said seat cushion, comprising the steps of:

covering the manually adjustable vehicle seat with a heat-sealable plastic film shaped to cover the vehicle seat;

placing the film around the adjustor bar such that first and second seal portions of said film are in engagement with one another, and a surrounding portion of said film interconnecting said first and second seal portions extends around said adjustor bar; and securing the first seal portion to the second seal portion to form a seam that extends the length of the adjustor bar and thereby secure the film to the vehicle seat.

9. The method as defined in claim 8, further comprising the step of pulling a pocket defined by the film over a seat back of the vehicle seat.

10. The method as defined in claim 8, further comprising the step of securing a seat belt across a juncture between a seat cushion and a seat back of the vehicle seat.

11. The method as defined in claim 8, further comprising the step of wrapping the film around the adjustor bar and heat-sealing the film.

* * * * *